Jan. 7, 1941.　　　　G. WESTOVER　　　　2,227,612
METHOD AND APPARATUS FOR PHOTOGRAPHICALLY COMPOSING TEXT MATTER
Filed April 26, 1938　　　9 Sheets-Sheet 4

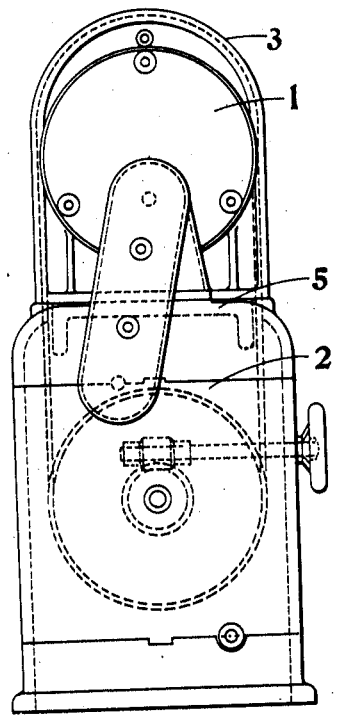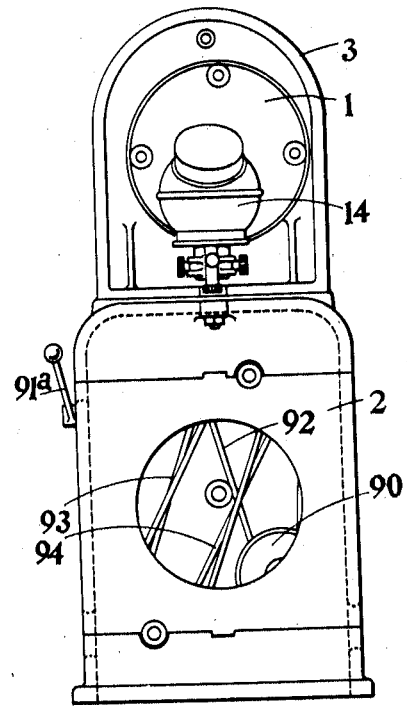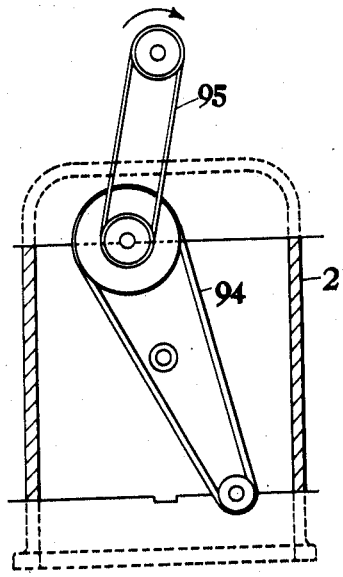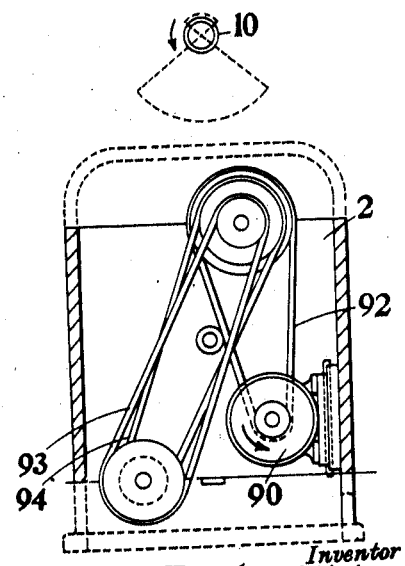

Inventor
G. Westover:
by
W. E. Evans
Attorney.

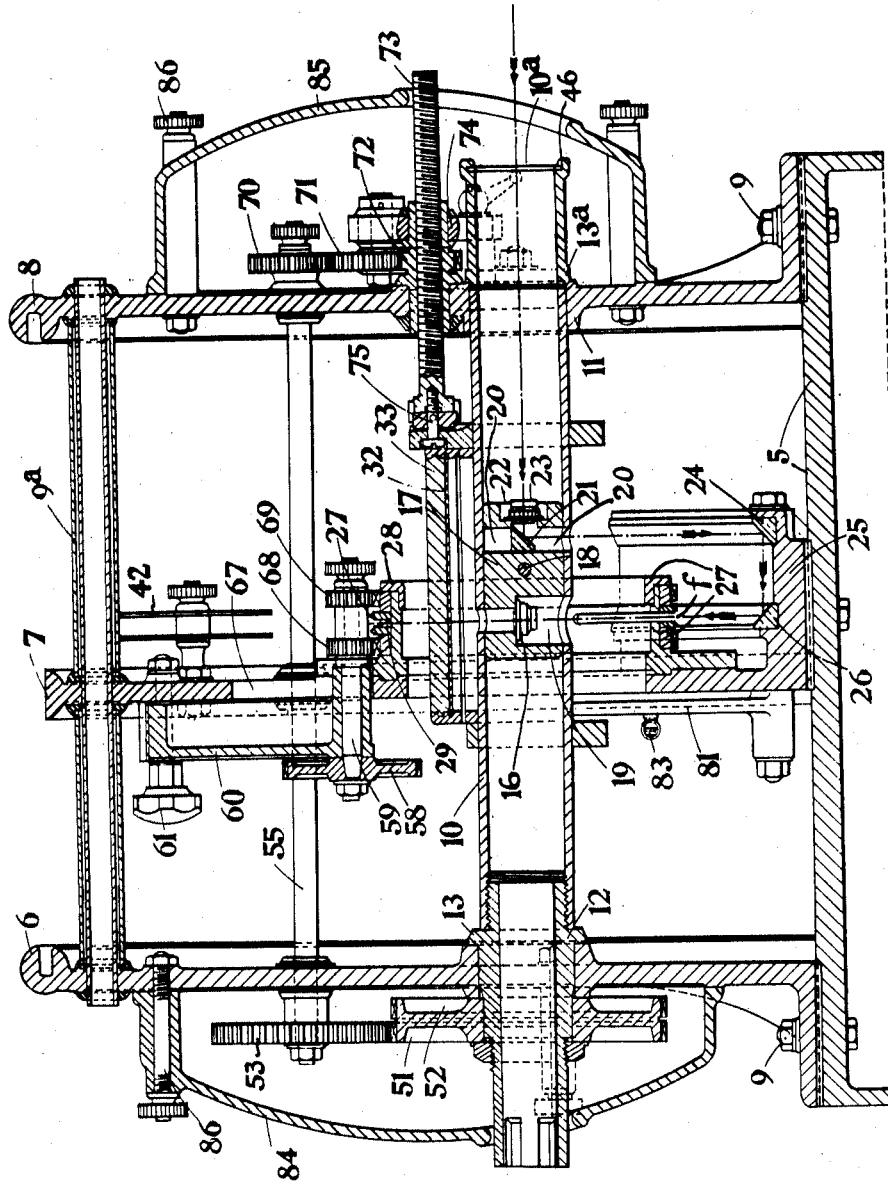

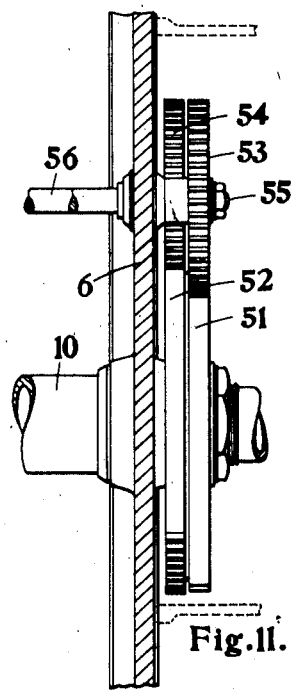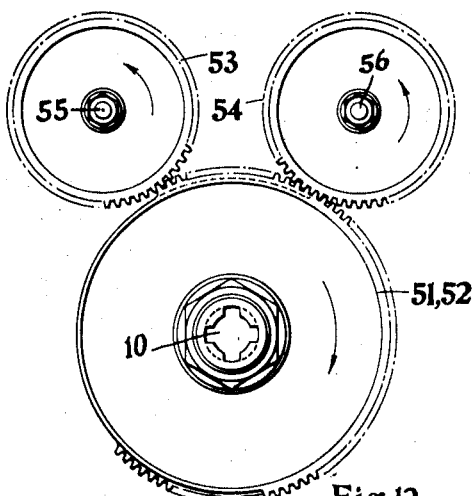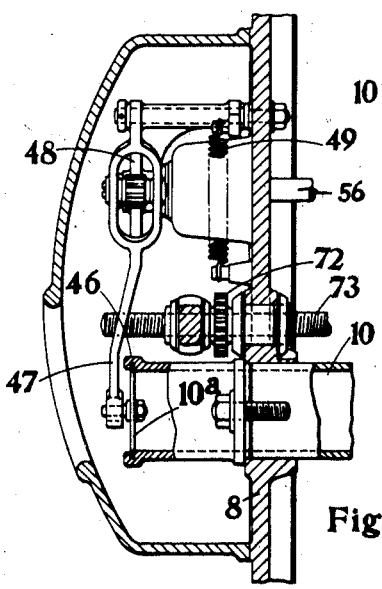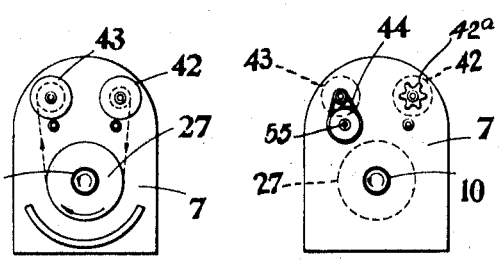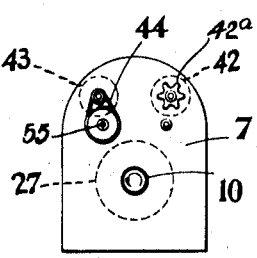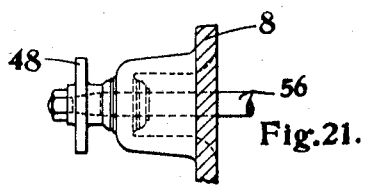

Jan. 7, 1941.  G. WESTOVER  2,227,612
METHOD AND APPARATUS FOR PHOTOGRAPHICALLY COMPOSING TEXT MATTER
Filed April 26, 1938   9 Sheets-Sheet 7

Inventor
G. Westover:
by
W. E. Evans
Attorney.

Jan. 7, 1941.  G. WESTOVER  2,227,612
METHOD AND APPARATUS FOR PHOTOGRAPHICALLY COMPOSING TEXT MATTER
Filed April 26, 1938  9 Sheets-Sheet 9
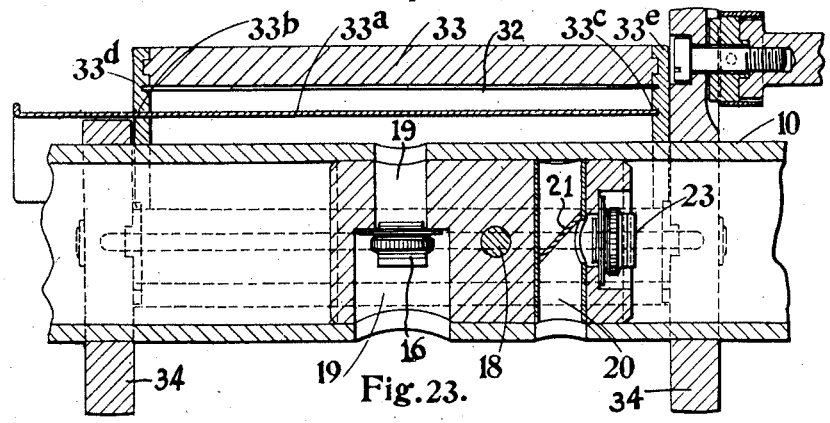
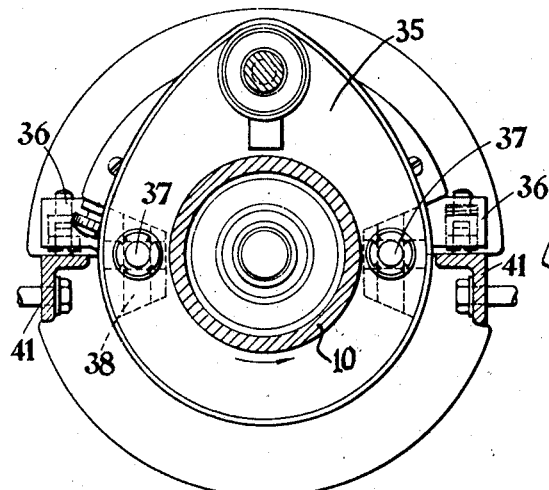
Fig.24.
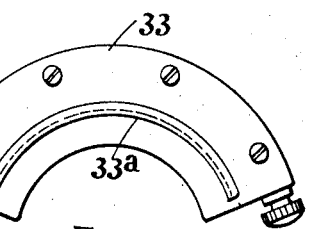
Fig.27.
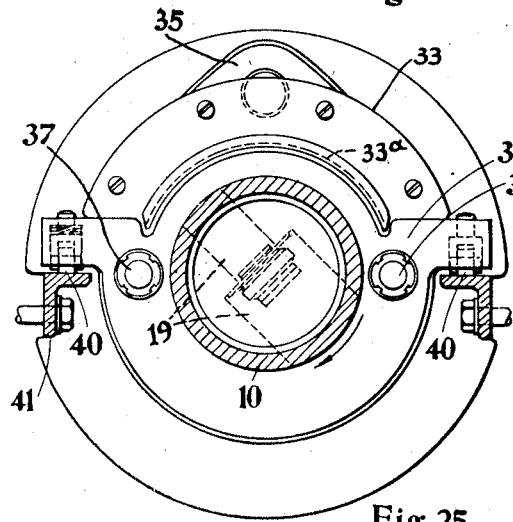
Fig.25.
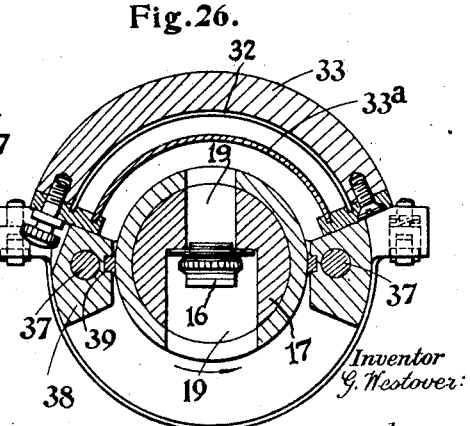
Fig.26.
Inventor
G. Westover:
by
W. E. Evans:
Attorney.

Patented Jan. 7, 1941

2,227,612

UNITED STATES PATENT OFFICE 2,227,612

METHOD AND APPARATUS FOR PHOTOGRAPHICALLY COMPOSING TEXT MATTER

George Westover, Balcombe, England

Application April 26, 1938, Serial No. 204,261
In Great Britain April 27, 1937

16 Claims.  (Cl. 95—4.5)

The invention relates to a novel and useful method and means for photographically composing letter press text into page form, and more particularly to such a method and means for photographically composing from a line-strip, carrying justified lines, a line at a time, onto a page-size, light-sensitive surface, capable of development and use in making page form printing plates.

The invention consists in the novel methods, steps, sequences, mechanisms and combinations disclosed in the specification and pointed out in the appended claims.

Objects and advantages of the invention are set out in part hereinafter, and in part will be obvious to those skilled in the art or may be learned by practice with the invention.

The accompanying drawings, referred to herein and constituting a part hereof, illustrate one mechanical embodiment of the invention and one manner of carrying out the method of the invention.

Of the drawings:

Figure 3 is an end elevation of one end of said apparatus corresponding to Figure 1.

Figures 4 and 6 are diagrammatic views of the driving mechanism shown in Figures 2 and 3.

Figure 5 is an end elevation of the page composing apparatus opposite to the end at which Figure 3 is taken.

Figure 7 is a detail vertical sectional view of the apparatus.

Figure 11 is a side sectional elevation corresponding to Figure 10.

Figure 12 is an end elevation of the driving gear shown in Figure 11.

Figures 17 and 18 are diagrammatic views on a reduced scale of the film feed system.

Figure 20 is a vertical part sectional side elevation corresponding to Figure 19.

Figure 21 is a detail view of the cam mechanism for operating the shutter illustrated in Figures 19 and 20.

Figure 23 is a vertical sectional elevation corresponding to Figure 22.

Figures 24 and 25 are respectively opposite end views corresponding to Figure 22.

Figure 26 is a vertical section corresponding to Figure 23.

Figure 27 is a detail view of the dark slide.

Figure 1:
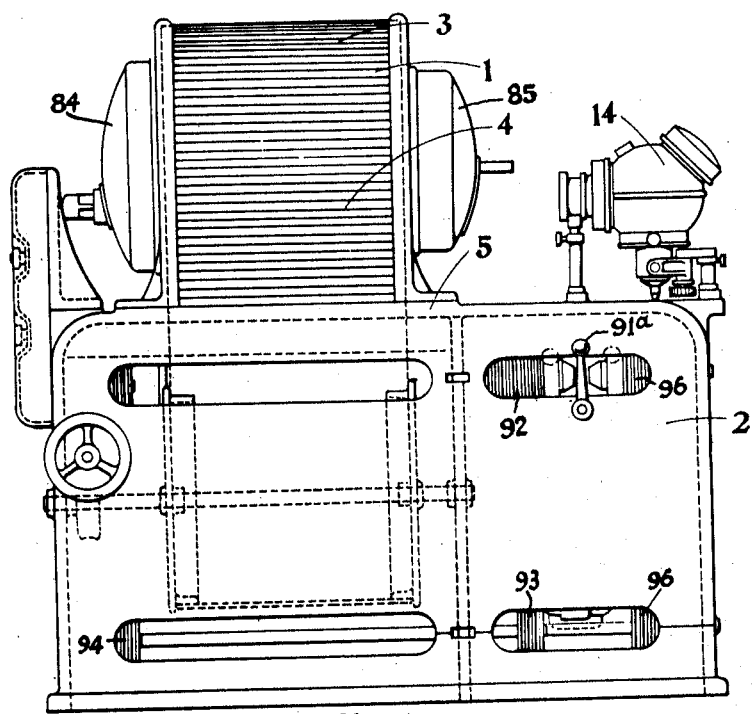
Figure 1 is a front view of a page composing apparatus according to the invention.
Figure 2:
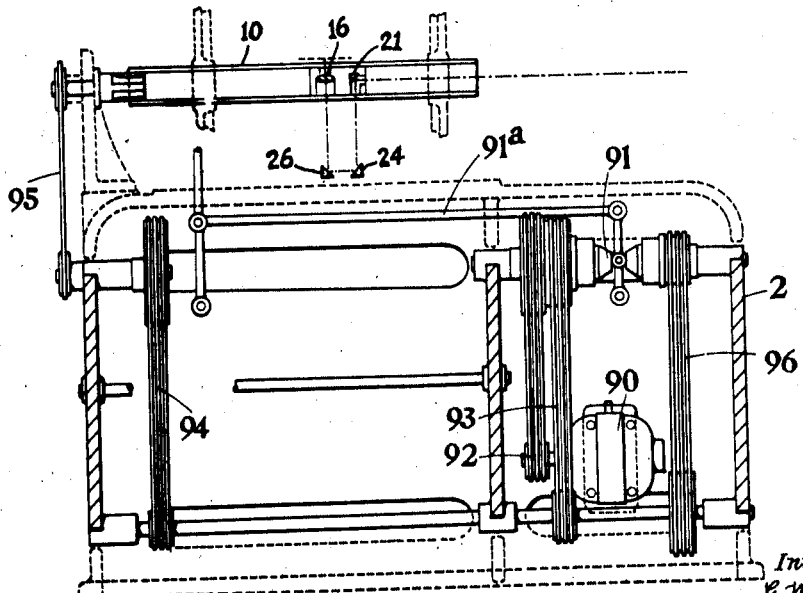
Figure 2 is a vertical sectional view corresponding substantially to Figure 1 with the lens tube cover and other parts removed to show the device.

According to the method of the present invention, previously-composed, photographable, and preferably previously-justified, lines of typographic characters are presented in longitudinal sequence at an exposure locus, and are photographed upon a page-size light-sensitive surface, a line at a time, so that the matter is light-impressed in line and page formation on the light-sensitive surface, which may be developed and the negative used in making page-form printing designs by various processes, e. g., rotogravure, offset, metal planographic. More particularly the method comprises feeding a photographable line-bearing strip longitudinally and in a concave form of uniform radius, bringing it to rest, presenting the page-size, light-sensitive surface in cylindrical, concave form of a uniform radius, these radii having a common axis, a lens, located between said strip and light-sensitive surface with its optical axis perpendicular to the aforesaid axis, is rotated about a coincident axis and swept along the presented line of characters to thereby impress the line photographically upon the page-size, light-sensitive surface, illuminating the lens during the photographing, shuttering the lens during an idle period, feeding the line copy strip longitudinally and feeding the page-form, light-sensitive surface longitudinally during the idle and shuttered portion of the rotation of the lens, so that the successively photographed lines will be impressed in page form on the light-sensitive surface.

Method and mechanism are adapted to use a copy-bearing negative comprising a line-wide strip, bearing in longitudinal sequence along the strip justified lines of typographic characters, such as are produced by the method and mechanism shown and described in my copending application Serial No. 203,881, filed April 24, 1938, the exposed and reeled strip produced by said mechanism being later developed, proof corrected by substitution of corrected negative lines for incorrect, the corrected negative strip being reeled again for use in accordance with the present invention in making page-form negatives.

The mechanism as preferably embodied comprises a light-proof casing, within which are means for longitudinally and intermittently feeding and positioning at rest the line-wide, negative copy strip in a cylindrical path within the casing at constant radius relatively to the lens, means for presenting a light-sensitive, page-size sheet in concave cylindrical form on the opposite side of the lens from the copy strip, the copy strip and light-sensitive page having a common axis, a lens or system of lenses with the lens axis rotatable about the same axis as the copy and the light-sensitive surface, means for projecting light through the negative copy strip and lens for photographing the lines on the light-sensitive surface, means for shuttering the lens, means for variably longitudinally feeding the line strip negative for different line measures and side page margins and means for advancing the page-form, light-sensitive surface to bring successive light-impressed lines of characters in page alinement, with "solid" or "leading" effects where desired.

More in detail, the composing mechanism comprises a lens or lens system mounted on an axis passing through the center of the lens in a direction perpendicular to that plane containing the optical axis and the line to be photographed and between a holder for the line-bearing member and a holder for the page-sheet and mechanism for rotating the lens so that the object field thereof is caused to travel along an exposed line of text and project it onto the page sheet. During part of each rotation of the lens, one line is photographed onto the page, and during the remainder of the rotation the film and page are moved appropriately so that the next line may be photographed in its proper position on the page.

The lens is shuttered or rendered inoperative during the idle portion of its rotation which will depend on the length of the line projected. The characters on the line-bearing element which may be a 16 mm. film are all 28.4-point in size.

The corrected film is wound on a spool and in this form is convenient for handling or storage, and it is in this form when required for use on the page-composing apparatus according to the invention.

It will be necessary to ensure that there is sufficient "overrun" or spare lengths of film at the beginning and the end of the film to allow for starting and finishing the page. For the purpose short lengths of old film may be used provided that they are light-proof and these may be secured to the ends of the film proper with ordinary film cement in accordance with the usual cinematograph film practice.

The projection drum around which the film passes, is partially rotated from time to time, the timing and extent of the movement being adjustable as required. The timing is determined by the photographic operation itself, the movement occurring after the completion of the exposure of one line and before the commencement of the exposure of the next. The extent of movement is governed by the length of the line, that is, by the typographic measure, the movement being the amount necessary to bring the first (or the last) character in one line into the precise position previously occupied by the corresponding character in the preceding line. Thus it will be understood that the extent of movement is necessarily more for a long line than for a short line.

The rotation of the projection drum is always in the same direction, so that movement of the film is a series of intermittent feeds all in one direction, each unit of feed being equivalent to the measure, that is, the text measure plus the margins.

The lens rotates continuously in the center of the projection drum. During one part of the revolution it sweeps along an exposed line text on the line-bearing strip which is in position on the drum and projects the said line onto the page sheet and during the remainder of the rotary movement the lens is inoperative.

The intermittent movements of the film are timed to occur while the lens is idle and not while the image is being projected. In other words, the film is stationary during the actual exposure operation but is fed on during the "idle sector" of the lens revolution. Likewise, during the operative movement of the lens, the page sheet is stationary. The proportion of the projection sector to the idle sector of the lens revolution will vary according to the line measure.

While the lens is moving through the idle part of the sector, several functions are performed by the apparatus. First the film is fed on the length of one line, secondly the page-sheet on which the lines from that film are to be projected in succession, is also fed on, as otherwise the second line would be photographed on top of the first and there would be double exposure. Thirdly a shutter is operated between the illuminant and the lens as otherwise the lens will project an image onto the page while the feeds are taking place resulting in a blurred image.

The feed movement of the page-sheet above-referred to is governed by the final point size of the reproduction. While such feed movement must not be less than the point size it may be much greater as is required. Normally the movement of the page will be equal to the point size of the final reproduction. At 12-point for example, the movement will be .166" or one-sixth of an inch which is a condition known technically as "solid." It will be understood that the foregoing general description, and the following detail description as well, are exemplary and explanatory but are not restrictive of the invention.

Referring now in detail to the embodiment of the invention illustrated by way of example in the accompanying drawings, the mechanism comprises an upper casing 1 and a lower casing 2 on which the upper casing 1 is mounted and which serves to house the driving gear of the apparatus.

The casing 1 is formed of part cylindrical shape at the top part 3 and on one side is provided with a slidable cover 4, in the manner of a roll top desk, made of metal, which may be raised when starting a new page or when taking out a completed one.

The bed-plate 5 of the upper casing 1 forms the top cover of the lower casing 2.

The projecting apparatus is housed within the upper casing 1 and comprises three upright frame members respectively 6, 7 and 8 which are of cast iron and are secured to the bed-plate 5 by bolts 9, and at the upper ends are secured together by a tube or stay rod 9a which extends the length of the casing. The frame members 6, 7 and 8 are disposed in parallel relation, the members 6 and 8 serving as the end-plates of the casing 1 and the member 7 forming an intermediate partition member between the two end members 6 and 8.

The embodied form of means for effecting the photographic copying comprises a long, rotatable tube 10, within which a lens 16 is fixed to rotate with the tube, and exterior means for projecting light into tube 10 from one end thereof, and for reflecting it through the stationary copy line-strip f, through the rotating lens 16 and onto the stationary light-sensitive sheet 32. The lens tube 10 is of hollow cylindrical form, advantageously ground both on the outside and the inside, is mounted to rotate in bearings 11 in the upright 8 and is supported at the other end, by an extension 12 screw-threaded thereon, in the upright frame member 6. Flanges 13 and 13a are provided at the respective ends of the tube to prevent lateral movement.

The rotatory drive for the tube 10 is taken through the extension 12 of the tube, and at the other end of the tube is provided a shutter 10a as hereinafter described.

The lens assembly is mounted within the lens tube 10 and comprises a lens 16 which is slid into position inside the tube 10 with its axis extending transversely of the tube. The lens 16 is mounted within a light-transmitting, diametrally-disposed cylindrical passage 19 formed in a cylindrical block 17, which is fixed within tube 10 (Figs. 7 and 26) and is advantageously made of mild steel which is secured by means of tapered dowel pins 18 at a position approximately halfway along the tube. In block 17 is another diametrally-disposed, light-transmitting cylindrical passage 20, passages 19 and 20 being parallel, and a light-transmitting passage 22 in block 17, concentric with tube 10 extends from the exterior of the block into the passage 20. The tube 10 is apertured at one end of passage 20 and at both ends of the passage 19. Within passage 22 is mounted a lens 23, and at the juncture of passages 22 and 20 is a 45° reflector 21. Two external reflecting mirrors 24 and 26, later described, reflect the light projected from mirror 21 through the line copy strip at f (that is, along the entire arcuate light-passing opening in the drum 27), into passage 19, through lens 16 and onto the light-sensitive page-size surface 32. The lens 23 serves to concentrate the illumination.

Light is projected from a lamp 14 such as a spot arc lamp (Figures 1 and 5) in the direction of the arrows along the longitudinal axis of the tube on to the lens 23 and on to the reflector 21 by which it is deflected at right angles.

There is ample space in the lens tube to accommodate condensers should these be found necessary.

The tube 10 is drilled at positions to correspond to the holes 19, 20 in the block 17 (Figs. 7, 23).

In the position of projection as shown in Figure 7, the light is reflected downwardly from the reflector 21 on to a reflector 24 formed of metal—stainless steel—of triangular cross-section mounted in a part cylindrical supporting fitting 25 secured on the bed-plate 5 of the casing 1, and reflecting light on to an oppositely disposed and similarly formed reflector 26 mounted in the fitting 25 which is positioned to reflect the light on to the lens 16.

A number of interchangeable projection drums are preferably provided to carry the film, each drum having a diameter suitable for each point size in which it is intended to make the final reproductions on the page-sheet. Thus to make eight, nine, ten, eleven and twelve point final reproductions five drums will be required, the size of the drums being governed by the lens which it is decided to use. The apparatus according to the invention has been designed to use a lens of a focal length of 4 cms. so that when focussed to project on the page-sheet, a 12-point image from a 28.4 point object the distance from the optical centre of the lens will be 13.47 cms. which dimension will be in effect the radius of a 12-point projection drum, the drums being provided with a radius to the nearest sixteenth in diameter; thus 13.47 cms. radius equals 10⅝" pitch diameter which would accommodate 170 teeth at 16 d-pitch. The projection drum is mounted on a cylindrical bracket 28 which is supported on the upright member 7, the bracket being located accurately so that it is concentric with the lens tube 10. The bracket 28 is cut away over a sector not less than 138° at its lower part to allow the passage of light to the lens 16 through the 16 mm. film which travels around the lower part of the drum. The projection sector varies from 39° in the case of 12½ ems of 8-point to 138° in the case of 32½ ems of 12-point. The drum 27 is formed in two sections separated by a stationary segmental distance piece 29 (Figs. 7, 8, 9) which is secured to the stationary bracket 28. This distance piece leaves at the lower part of the drum an open sector of not less than 138° between the parts of the drum. When the film is stationary, in the projection position, the line of text-matter to be projected lies over the open sector between the two annular parts of the drum which is coincident with the cut-away part of the bracket 28, to allow the passage of light through the film-strip. The parts of the drum are free to rotate on the bracket 28, but relative lateral movement between the parts thereof is prevented by an annular flange 30 secured on the outer circumferential rim of the bracket 28.

Sprocket teeth 31 are provided on the two parts of the drum (Fig. 8) to project outwardly and radially therefrom so as to engage in perforations in the film.

Figure 8:
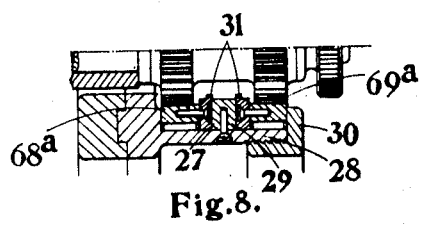
Figure 8 is a detail sectional view of a double-edge feed for the film.
Figure 9:
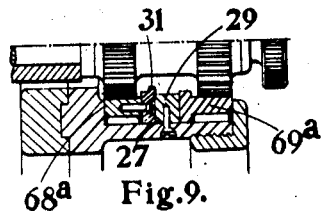
Figure 9 is a detail sectional view of a single edge feed for the film.
Figure 10:
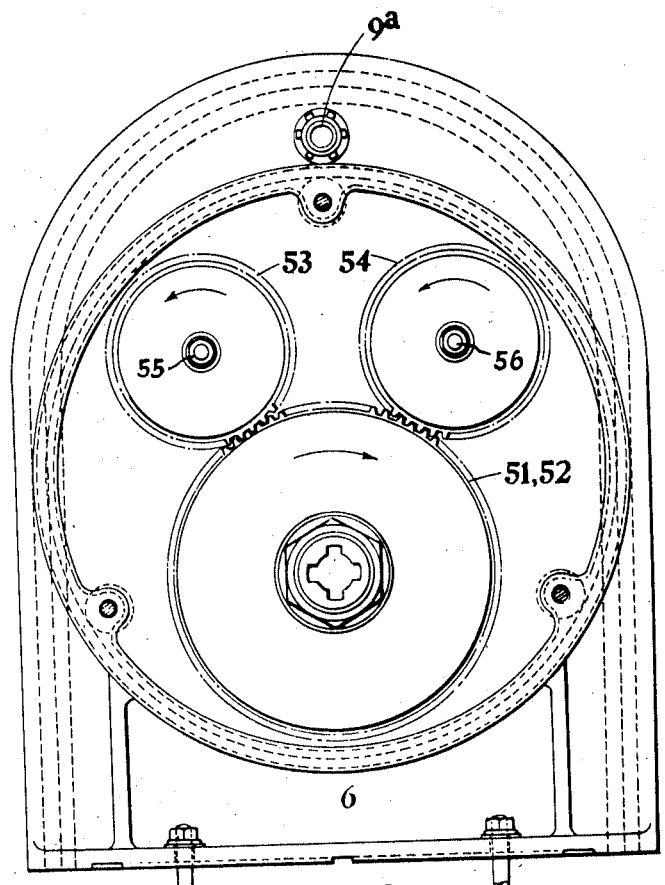
Figure 10 is an elevation of the main and subsidiary gears that are mounted upon a supporting frame on the upper part of the page composing apparatus.

As shown in Figure 8 the sprocket teeth 31 may be provided in double series spaced apart on either side of the member 29 where the film has perforations along both edges; alternatively the sprocket teeth may be provided in single series as shown in Figure 9, where for example a film is shown provided with perforations along one edge only.

The light-sensitive page-sheet 32 (Fig. 23) is bent to cylindrical form and is carried on the inner surface of a part cylindrical member 33, hereinafter referred to as the dark slide, mounted co-axially with the lens tube 10 and between the tube 10 and the drum 27, the distance apart of the dark slide and lens tube being in accordance with the extent of magnification required. It is proposed to use a dark slide for each point size to accommodate all measures from 12½ ems to 32½ ems. The dark slide is mounted on a carriage 34 formed with end parts 35, 36 secured together by rods 37 in blocks 38, felt washers 39 being provided to extend between the inner face of each block and the lens tube to prevent the access of light to the page otherwise than through the lens. The carriage 34 is formed with laterally projecting flanges on which are mounted rollers 40 (Figs. 24, 25) which are adapted to run on rails 41 secured by bolts at the edge of the opening in the upright member 7 and extending to the upright member 6, sufficient clearance being provided in between the walls of the opening to permit of the free rotation of the lens tube and the axial movement of the dark slide. A dark slide cover of curvilinear form 33a (Figure 23) is supported in a curvilinear slot 33b, extending through the front wall 33d of the slide and at the other end is supported in a groove 33c formed in the rear end wall 33e of the slide. The cover 33a is provided as a protection for the sensitised page-sheet mounted in the dark slide before it is mounted in position in the apparatus and is removed before projection.

Two film-carrying spools 42, 43 (Figures 13 and 14) are mounted on the end member 7 in horizontal alignment and in vertical alignment with the drum. The spool 42 carries the 16 mm. film which is carried around the drum 27 as shown in Figure 17, the sprocket teeth 31 on the drum engaging the perforations in the film and the film being wound on to the spool 43 after the lines have been projected onto the page-sheet 32.

The film take-up spool 43 may be driven from the secondary shaft 55 by a flexible or yielding belt 44, such for example as a helically wound spring belt, so adjusted as to wind all the film fed to it by the drum 27 and to cause slippage of the belt so as to avoid excessive rotation of the spool. Figs. 17, 18.

Film is drawn from the delivery spool 42 by the intermittent rotation of drum 27, and its rotation may be retarded to maintain tension on the film by the action of a friction device such as the spider spring 42ª. Fig. 18.

The delivery spool 42 receives its movement from the drum through the 16 mm. film and the receiving spool 43 is driven through gearing or belt, in which case a helical spring acts as the medium.

Figure 19:
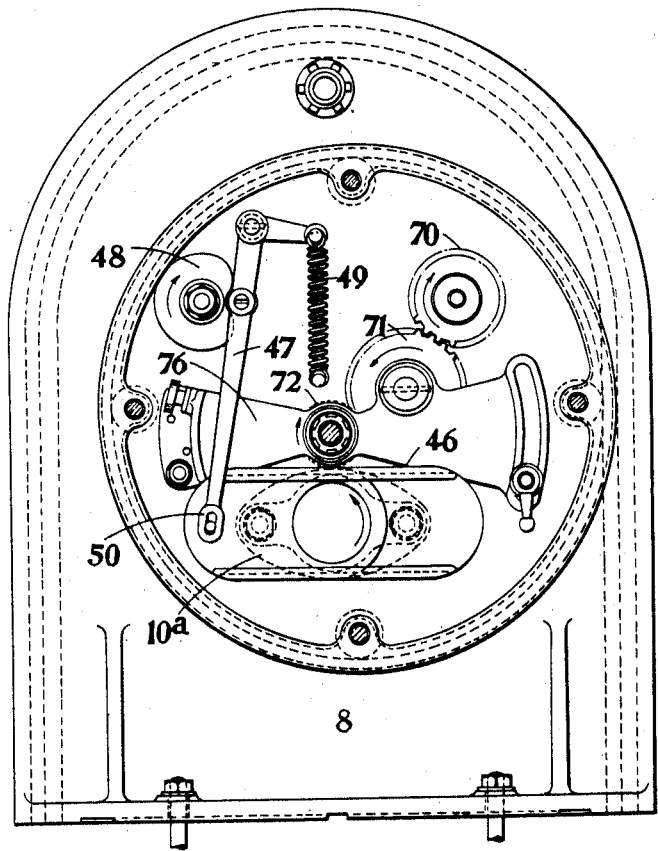
Figure 19 shows in end elevation the details of shutter adjustment and dark slide feed mechanism mounted on an end support of the upper casing of the apparatus for various point sizes of final reproduction.
Figure 22:
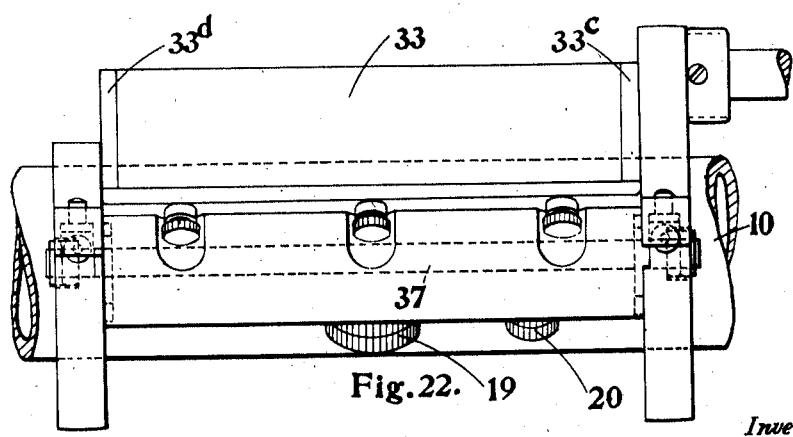
Figure 22 is a side elevation of the lens assembly and the dark slide containing the page of final reproduction.

The shutter 10a (Figs. 7, 19) is provided at the open end of the lens tube 10 to slide horizontally in a housing 46 mounted on the end of the lens tube. The shutter is operated through a bell crank lever 47 (Fig. 19), mounted on the end member 8, by means of a heart-shaped cam 48, the lever 47 being anchored at one end by a spring 49 and at the other end being connected through a pin and slot connection 50 to the shutter 10a which is thus adapted for an intermittent to and fro movement in a horizontal direction to open and close the shutter so as to permit a ray of light from the lamp to pass down the lens tube on to the reflector and thence to be reflected on to the lens 16. The return movement of the shutter is effected by a spring 49.

Assuming the limits of measure to be 12½ ems to 32½ ems, that is 25 ens to 65 ens it will be necessary to arrange for the projection drum to be partially rotated to the extent of 25 to 65 teeth since the distance on the pitch circumference between the centre line of adjacent teeth of 16 D. P. is equal to an en of 28.4 point. If a gear wheel with the required number of teeth, 25 to 65, is caused to complete one revolution in engagement with the teeth on the projection drum, the drum will be rotated the required amount.

Figure 13:
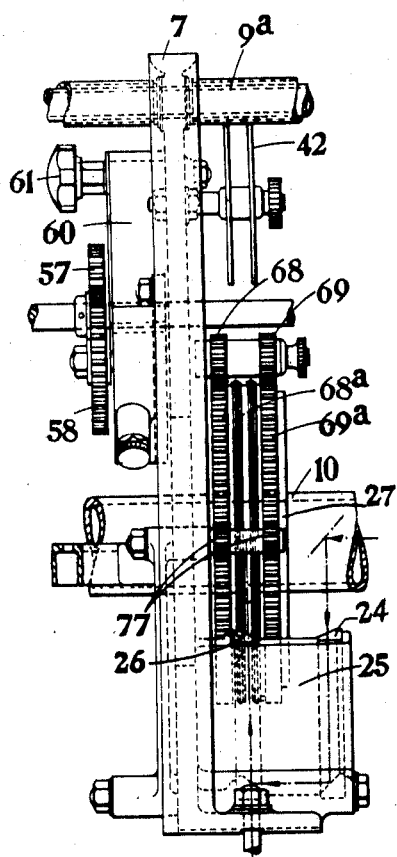
Figure 13 is a side elevation of the film feed mechanism mounted on the central support of the upper casing of the apparatus.
Figure 14:
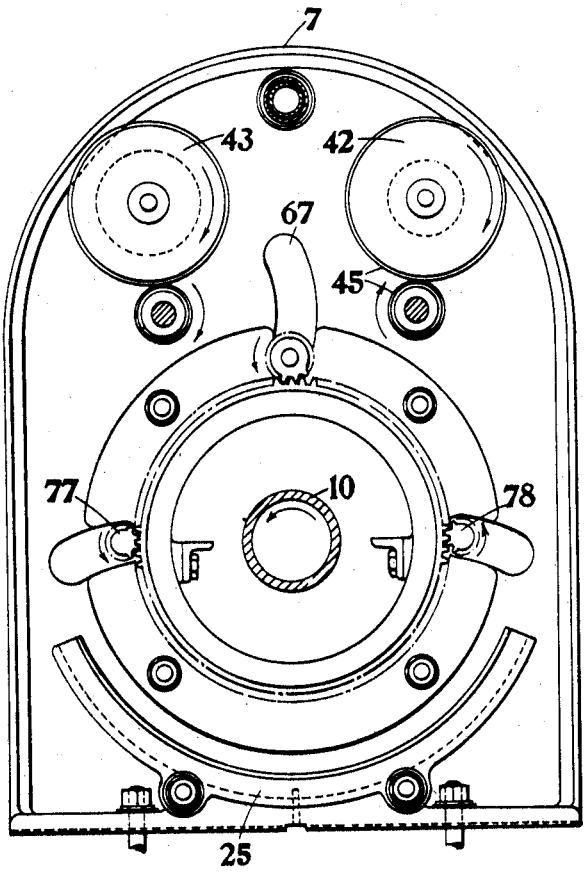
Figure 14 is an end elevation corresponding to Figure 13 viewed from that side of the apparatus from which the light is projected.
Figure 15:
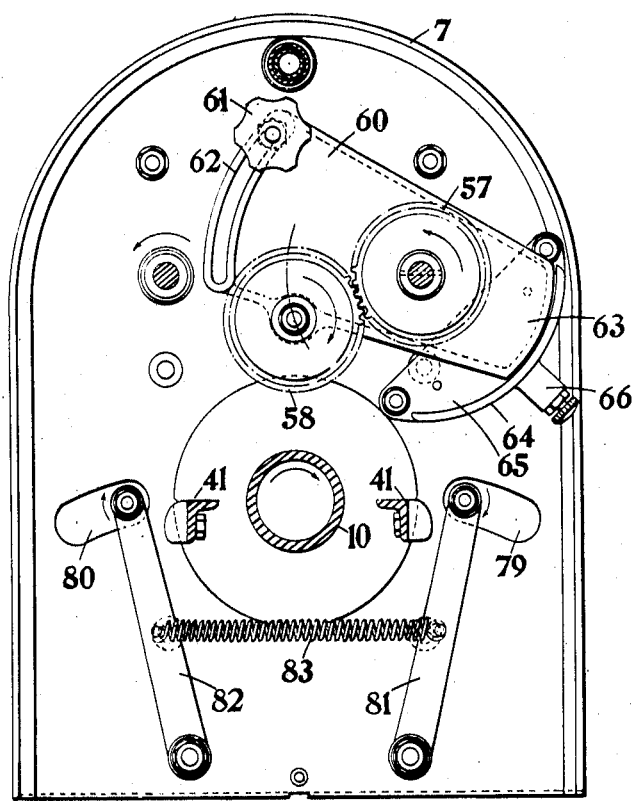
Figure 15 is an elevation corresponding to Figure 13 viewed from the opposite side.
Figure 16:
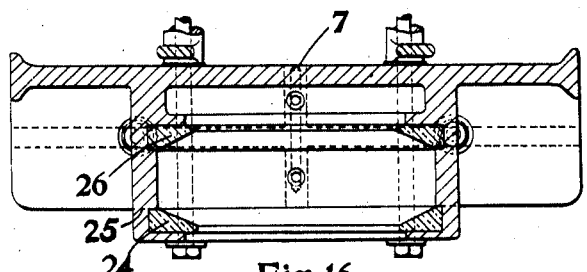
Figure 16 is a sectional plan of the reflectors shown in Figures 13 and 14.

The drive to the mechanisms described is taken from the lens tube. Externally of the casing adjacent the upright 6 there are mounted on the lens tube a pair of mutilated gear wheels 51, 52 which engage respectively gear wheels 53, 54 which are mounted respectively on subsidiary shafts 55, 56 which extend the full length of the casing 1 (Figs. 11, 13).

The mutilated gear wheels 51, 52 thus provide intermittent drive from a continuous drive, that is to say the lens tube, and operate to cause a complete revolution of each subsidiary shaft during engagement. The sectors from which the teeth are removed on the gear wheels will not be less than 138° the maximum "projection" movement of the lens. The shaft 55 is provided at an intermediate position between the uprights 6 and 8 with a gear wheel 57 which engages a gear wheel 58 mounted on a short counter shaft 59 carried in a swinging bracket 60 which is adjustable by means of a hand-operable screw 61 in a curved slot 62 at one end, and at the other end is formed with a curved face 63 held in a correspondingly formed guide 64 on a bracket 65, by means of a screw 66.

The shaft 59 extends in bearings in the bracket 60 and through a curved slot or aperture 67 in the upright 7 and carries at its other end a pair of pinions 68, 69 keyed thereon and spaced apart to engage respectively two sets of peripheral gears 68a, 69a provided circumferentially on the two parts of the drum.

The bracket 60 which carries the counter shaft 59 is arranged to swing on the driving shaft in order to accommodate the variation in the distance between the centre lines of the drum and of the driving pinions according to the sizes of both. The driving pinions are made in stages of five teeth so that there will be nine pinions to cover the whole range from 25 to 65 teeth. The difference of five teeth on the driving pinions thus corresponds to a difference of five ens (2½ ems) in the measure. The drum will thus be rotated approximately $$\frac{65}{170} \text{ by } 360° = 138°$$

thus providing the necessary feed for the 16 mm. copy.

The upright 8 supports the mechanism for operating the intermittent feed of the dark slide carrying the page film. The motive power of the drive to the feed is derived from the subsidiary shaft 55 which makes one complete revolution between every two lines. This movement is imparted through gear wheels 70, 71 and 72, which are of a size chosen by the apparent point size of the final reproduction required, the number of teeth on the gear wheels being determined by the formula $4 \times p$, where $p$ equals the point size of the final reproduction. The motion is transmitted from the gear wheel 70 through the intermediate gear wheel 71 to a gear wheel 72 which rotates on a screwed spindle 73. The gear wheel 72 is fixed transversely by means of stop 74 screwed on to the spindle 73, and has no lateral movement so that lateral movement is transmitted by means of the screw thread to the spindle 73 on which the gear is assembled and this lateral movement of the spindle is transmitted in turn to the dark slide carriage 33 to which it is secured as by a pin 75.

The numbers of teeth on the gear wheels 71 and 72 do not vary so that the two wheels may be permanently mounted in a swing bracket 76 which rotates on the axis of the screwed spindle 73. The use of an intermediate gear wheel 71 is necessitated by the fact that whereas the distance between the centre lines of the shaft and the screwed spindle is constant one of the gears, the first in the train is variable.

Pairs of guide pinions 77 and 78 (Fig. 14), are mounted to extend through curved slots 79, 80 in the upright 7, on levers 81, 82, which are pivotally mounted on the upright 7 and extend at an inclination on either side of the drum 27 to engage the teeth 68a, 69a thereon. The pinions are held in resilient engagement with the teeth 68a, 69a by means of a spring 83, the pinions serving as guides for the drum.

Covers 84 and 85 (Fig. 7) are provided to enclose the projecting parts of the mechanism at the ends of the casing and are secured respectively to the uprights 6 and 8 by screws 86, an aperture being formed in the cover 85 in alignment with the lens tube to permit the passage of light from the lamp and the axial movement of the screwed spindle 73.

In operation the lens tube rotates continuously. The drum 27 is driven intermittently to present in succession each line of text on the film, to be projected. The particular line of text to be projected is positioned coincident with the open sector between the two parts of the drum 27. On reaching this projection position the drum is stopped with the open arc of 138° now at the bottom of the drum, and this open arc in the drum is in line with the open arc in the bracket 28. Within this arc, light is reflected, when the shutter 10a is opened for the appropriate predetermined period, on to the lens 16 and on the stationary page sheet held in the dark slide 33. After traversing the exposed line on the film-strip, and projecting it onto the page-sheet the drum stops, the lens tube continues to rotate and in the aforesaid idle interval during which the lens combines to rotate before it comes again into a position into which light may be projected on to the page sheet, the dark slide carrying the page sheet is moved forward by the intermittent feed so that the next line may be projected at the desired position below the line previously projected. During this idle movement of the lens, also, the drum 27 is partially rotated to bring the next line of text on the film strip to the projection position. Thus during one part of its revolution, the lens projects an image of a line on to the page-sheet; during the remainder of the revolution it is inoperative. The ratio of useful to idle angles of rotation varies with the measure, i. e., the text measure plus the pseudo margins and to a less extent on the magnification. For 2½ ems of 8-point the ratio is 39 to 321 and for 32½ ems of 12-point the ratio is 138 to 222. During the idle movement of the lens during which the film is fed on for a distance of one line, the page-sheet is moved in a direction perpendicular to a line for a distance that shall not be substantially less, but may be more, than the point size for a given point size of reproduction.

One advantage arising from a lens system as herein described utilizing a traversing lens is that since the lens has to cover relatively small page and image fields a small lens of short focal length can be used at a large aperture without loss of definition.

The rotation of the lens tube is effected in any convenient manner as from the drive assembly in the casing 2. Thus for example as illustrated in Figures 1 to 6, the lens tube is rotated from the electric motor 90 that is provided with a two speed belt drive. By means of the clutch 91 high speed drive is obtained through the belt drives 92, 93, 94 and 95. For operating at low speed the belt 92 is thrown out of action by manipulation of the hand lever 91a of the clutch 91 and the belt drive 96 put into operation.

The invention consists in the novel steps, sequences, elements and combinations as pointed out in the accompanying claims, and it will be understood that departures may be made from the specific forms shown and described without departing from the principles of the invention and without sacrificing its chief advantages.

I claim:

1. A mechanism for photographically composing text matter in page form from previously-composed lines including in combination means for presenting a line of characters in arcuate form of constant radius, means for presenting a page-size, light-sensitive surface in cylindrical form opposite said line of characters with the axes coincident, a tube located between the aforesaid means and coaxial therewith, a lens mounted within the tube with its optical axis perpendicular to and intersecting the aforesaid axis, means for rotating the lens about said axis and means for projecting light into and along said tube and for deflecting the light and projecting it through the line of characters and the lens to impress the line of characters upon the light-sensitive surface.

2. A mechanism for photographically composing text matter in page form from previously-composed lines including in combination means for presenting a line of characters in arcuate form of constant radius, means for presenting a page-size, light-sensitive surface in cylindrical form opposite said line of characters with the axes coincident, a tube located between the aforesaid means and coaxial therewith, a lens mounted within the tube with its optical axis perpendicular to and intersecting the aforesaid axis, means for rotating the tube and lens about said axis and means for projecting light into and along said tube and for deflecting the light and projecting it through the line of characters and the lens to impress the line of characters upon the light-sensitive surface.

3. A mechanism for photographically composing text matter in page form from previously-composed lines including in combination a rotatable cylindrical support for a translucent line-strip bearing lines of typographic characters, said support having an arcuate light-transmitting opening in its periphery, a cylindrical support adapted to carry a page-size sheet having a light-sensitive surface upon its concave face, said support being coaxial with said rotatable cylindrical support and located therewithin, a rotatable orificed tube coaxial with said supports and extending therethrough, a lens fixedly mounted in said tube with its optical axis perpendicular to the aforesaid axis and in alinement with the orifices in said tube and said arcuate light-transmitting opening, means for projecting light longitudinally into said tube, means for deflecting the projected light and projecting it through said arcuate light-transmitting opening and the character-bearing film supported thereon and through the lens onto said light-sensitive surface, means for rotating said tube, a shutter for controlling the projection of the light, means for rotating said line-strip support, and means for axially moving said support 4. A mechanism for photographically composing text matter in page form from previously composed lines including in combination means for presenting a line-wide strip bearing lines of characters in arcuate form of constant radius, means for presenting a page-size, light-sensitive surface in concave cylindrical form opposite said line of characters with their axes coincident, a lens and means for supporting the lens with its axis perpendicular to and intersecting the aforesaid axis, means for rotating the lens about the aforesaid axis, means for projecting light through the line of characters and through the lens to impress the line of characters upon the light-sensitive surface, means for rotating said line strip presenting means to bring a new line of characters into photographing position, and means for axially moving said support for the light-sensitive surface so that successive lines of characters will be impressed on said surface in page form.

5. A mechanism for photographically composing text matter in page form from previously composed lines including in combination means for presenting for photographic reproduction lines of characters carried on a line-wide strip, said means comprising an arcuate support at the exposure locus, spools upon which the line strip is wound, means for presenting a page-size, light-sensitive surface in concave cylindrical form opposite said line of characters with their axes coincident, a lens and means for supporting the lens with its optical axis perpendicular to and intersecting the aforesaid axis, means for rotating the lens about the aforesaid axis, means for projecting light through the line of characters and through the lens to impress the line of characters on the light-sensitive surface, and means for intermittently rotating said spools to advance the line strip to present successive lines at the projection locus.

6. A mechanism for photographically composing text matter in page form from previously-composed lines including in combination means for presenting at an exposure locus a line-strip bearing sequential justified lines of characters, means for presenting a page-size, light-sensitive surface to receive a light impression of a presented line of characters, a lens relatively movable with respect to said strip and surface for impressing a presented line of characters upon the light-sensitive surface, shutter means for controlling the supply of light to said lens, means for moving said line-strip while the shutter is closed to present a new line to be photographed and means for moving the light surface longitudinally a distance corresponding to the predetermined line spacing of the page to receive the light-impressed lines in page alinement.

7. A mechanism for photographically composing text matter including in combination a text-line-supporting member, a support for a page sheet, a lens rotating on an axis at right angles to its optical axis and between said line-supporting member and page sheet support, means for continuously rotating the lens about said axis, means for longitudinally moving a text line on its support and means for intermittently moving the page sheet support perpendicularly to the text line.

8. A mechanism for photographically composing text matter including in combination a support for a line-carrying element, a holder for a sensitized page sheet, a lens mounted to rotate on an axis at right angles to its optical axis and between said support and holder, means for continuously rotating the lens so that the optical field thereof sweeps along an exposed line of text during a portion of said rotation, means for advancing the line-bearing element and means for advancing the page sheet during an idle or shuttered portion of the rotation of the lens.

9. A mechanism for photographically composing text matter including in combination a lens system comprising a lens mounted within a tube and in line with opposed openings therein, mechanism for rotating the tube continuously about an axis at right angles to the optical axis, a slotted drum arranged coaxially with said tube for supporting a text-bearing line-strip, means for partially rotating said drum to advance the line-strip, a dark slide for supporting a sensitized page sheet arranged coaxially with the lens tube, mechanism for moving the dark slide and page sheet step-by-step parallel with the lens tube and in timed relation with operative and inoperative intervals of the rotation of the lens.

10. A mechanism for photographically composing text matter including in combination a lens mounted on an axis at right angles to its optical axis, a movable support for a text-line strip, a support for a page sheet, both supports being coaxial with the axis about which the lens rotates, means for continuously rotating the lens, means geared with said lens rotating means for intermittently and circumferentially advancing the support for the text-line strip and means for intermittently and axially advancing the page sheet supports simultaneously during an idle portion of the rotation of the lens.

11. A mechanism for photographically composing text matter including in combination a lens mounted within a tube, means for continuously rotating the tube at right angles to the optical axis, a movable line-supporting drum coaxial with the axis of rotation of the lens, a movable supporting member for a page sheet arranged coaxially with the axis of rotation of the lens, a shutter for the lens mechanism, geared with driving mechanism for the lens for operating the shutter and mechanism for moving the text-line drum and the page-supporting member simultaneously during the closed position of the shutter.

12. The method of photographically composing text matter in page form from previously-composed lines which comprises presenting a line-strip bearing sequential lines of characters in arcuate form of constant radius, presenting a page-size, light-sensitive surface in cylindrical form opposite said line of characters with their axes coincident, rotating about said axis a lens having its optical axis perpendicular to and intersecting the aforesaid axis, projecting light through the line of characters and through the lens to impress the line of characters upon the light-sensitive surface, cutting off the projected light, moving the line-strip longitudinally a distance proportionate to the line measure to present a new line to be photographed and advancing the light-sensitive surface longitudinally a distance corresponding to the predetermined line spacing of the page.

13. A mechanism for photographically composing text matter in page form from previously-composed lines including in combination means for successively presenting lines of characters in arcuate form of constant radius, means for presenting a line-wide arcuate portion of a page-size, light-sensitive surface in cylindrical form, said arcuate line of characters and said line-wide arcuate portion of the light-sensitive surface being arranged diametrically opposite a common axis, means for intermittently moving the line of characters and surface axially with respect to each other, a lens and means for supporting the lens with its optical axis perpendicular to the aforesaid axis and intersecting the arcuate line of characters, means for rotating the lens about the first axis, means for projecting light through the line of characters and through the lens to impress the line of characters upon the light-sensitive surface, a shutter for the light passing through the lens and means for closing the shutter while the line and surface are relatively axially moved.

14. A mechanism for photographically composing text matter in page form from previously-composed lines including in combination means for presenting a line of characters in arcuate form of constant radius, means for presenting a line-wide arcuate portion of a page-size, light-sensitive surface in cylindrical form, said arcuate line of characters and said line-wide arcuate portion of the light-sensitive surface being arranged diametrically opposite a common axis, a lens and means for supporting the lens with its optical axis perpendicular to the aforesaid axis and intersecting the arcuate line of characters, means for rotating the lens about the first axis, means for projecting light through the line of characters and through the lens to impress the line of characters upon the light-sensitive surface, and means for intermittently axially moving the light-sensitive surface after the projection of the line has been completed to present a fresh line-wide arcuate portion for exposure.

15. A mechanism for photographically composing text matter in page form from previously-composed lines including in combination means for presenting a line of characters in arcuate form of constant radius, means for presenting a line-wide arcuate portion of a page-size, light-sensitive surface in cylindrical form, said arcuate line of characters and said line-wide arcuate portion of the light-sensitive surface being arranged diametrically opposite a common axis, a lens and means for supporting the lens with its optical axis perpendicular to the aforesaid axis and intersecting the arcuate line of characters, means for rotating the lens about the first axis, means for projecting light through the line of characters and through the lens to impress the line of characters upon the light-sensitive surface, and means intermittently feeding a new longitudinal portion of the line of characters into projection position.

16. A mechanism for photographically composing text matter in page form from previously-composed lines including in combination means for intermittently longitudinally feeding and presenting a line of characters in arcuate form of constant radius, means for intermittently axially feeding and presenting a line-wide arcuate portion of a page-size, light-sensitive surface in cylindrical form, said arcuate line of characters and said line-wide arcuate portion of the light-sensitive surface being arranged diametrically opposite a common axis, a lens and means for supporting the lens with its optical axis perpendicular to the aforesaid axis and intersecting the arcuate line of characters, means for rotating the lens about the first axis, means for projecting light through the line of characters and through the lens to impress the line of characters upon the light-sensitive surface, and means for stopping the projection during the intermittent feeding movements.

GEORGE WESTOVER.